United States Patent
Asada et al.

(10) Patent No.: US 7,548,014 B2
(45) Date of Patent: Jun. 16, 2009

(54) ULTRASONIC TRANSDUCER

(75) Inventors: Takaaki Asada, Moriyama (JP); Takayuki Shimamoto, Moriyama (JP); Koji Murata, Kusatsu (JP); Mio Furuya, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 12/103,912

(22) Filed: Apr. 16, 2008

(65) Prior Publication Data

US 2008/0218030 A1 Sep. 11, 2008

Related U.S. Application Data

(63) Continuation of application No. PCT/JP2006/324771, filed on Dec. 12, 2006.

(30) Foreign Application Priority Data

Dec. 14, 2005 (JP) .............................. 2005-360887

(51) Int. Cl.
*H01L 41/08* (2006.01)
(52) U.S. Cl. ..................... 310/348; 310/334
(58) Field of Classification Search ................ 310/348, 310/334, 335, 336, 322, 324; 367/188; *H01L 41/08*
See application file for complete search history.

(56) References Cited

U.S. PATENT DOCUMENTS 5,457,352 A * 10/1995 Muller et al. ............... 310/334
6,250,162 B1 * 6/2001 Amaike et al. .............. 310/334
6,876,127 B2 * 4/2005 Mitsuoka et al. ............ 310/324
7,317,663 B2 * 1/2008 Kawashima et al. ........ 367/188

FOREIGN PATENT DOCUMENTS

| JP | 2001-128292 A | 5/2001 |
| JP | 2001-169392 A | 6/2001 |
| JP | 2001-232294 A | 8/2001 |
| JP | 2002-135894 A | 5/2002 |
| JP | 2004-015150 A | 1/2004 |
| WO | 2005/009075 A1 | 1/2005 |
| WO | 2007/029559 A | 3/2007 |

OTHER PUBLICATIONS

Official communication issued in the International Application No. PCT/JP2006/324771, mailed on Apr. 10, 2007.

* cited by examiner

*Primary Examiner*—Quyen Leung
*Assistant Examiner*—Karen B Addison
(74) *Attorney, Agent, or Firm*—Keating & Bennett, LLP

(57) ABSTRACT

An ultrasonic transducer includes a cylindrical cap member having a bottom. A piezoelectric element is bonded to the inner side of a bottom portion of the cap member using a conductive adhesive or other suitable adhesive. An inner frame made of a material having an acoustic impedance greater than that of the cap member is fitted into the cap member so as to be in contact with a side portion, including the end portion, of the cap member. Through-holes are provided in the side portion of the inner frame. Lead wires are connected to the piezoelectric element and the inner frame, respectively. A sound absorber and a damper are inserted into the inner frame. The damper is in direct contact with the side portion of the cap member via the through-holes of the inner frame.

12 Claims, 15 Drawing Sheets

TIME

TIME

ULTRASONIC TRANSDUCER

BACKGROUND OF THE INVENTION

1. Field of the Invention

The present invention relates to ultrasonic transducers, and in particular, to ultrasonic transducers used as, for example, back-up sonar devices for automobiles.

2. Description of the Related Art

FIG. 15 illustrates an example of a known ultrasonic transducer. An ultrasonic transducer 1 includes a cylindrical outer case 2 with a bottom. A piezoelectric element 3 is disposed on the inner bottom surface of the outer case 2. Furthermore, a cylindrical directivity controller 4 is disposed inside the outer case 2. As shown in FIG. 16, the directivity controller 4 has thick portions and thin portions formed by, for example, a hexagonal through-hole. This directivity controller 4 is fitted into the outer case 2 so as to be in contact with the side surface and the bottom surface of the outer case 2. A back plate 5 is fitted into the outer case 2 at a position adjacent to the opening of the outer case 2, and the end portion of the outer case 2 is crimped such that the back plate 5 is fixed in place. The back plate 5 includes two terminals 6a and 6b to which lead wires 7 are connected. The terminal 6a is connected to one side of the piezoelectric element 3 via a metallic layer disposed in the back plate 5 and the outer case 2. On the other hand, the terminal 6b is connected to the other side of the piezoelectric element 3 using a lead wire 8.

This ultrasonic transducer 1 can be attached to, for example, a bumper of an automobile, and can be used as a back-up sonar device. When driving signals are input to the lead wires 7, the piezoelectric element 3 is excited, and consequently, the bottom portion of the outer case 2 is vibrated. With this configuration, ultrasonic waves are radiated along a direction orthogonal to the bottom surface of the outer case 2. The directivity of the ultrasonic waves radiated is determined by the shape of the through-hole of the directivity controller 4. When the radiated ultrasonic waves are reflected from an obstacle, the reflected waves are received by the ultrasonic transducer 1, and converted into electrical signals by the piezoelectric element 3. The electrical signals are transmitted to a receiving circuit via the lead wires 7 such that the distance to the obstacle is calculated from the time difference between the transmission and reception of the ultrasonic waves.

In this ultrasonic transducer 1, each of the outer case 2 and the directivity controller 4 can be easily processed since the outer case 2 and the directivity controller 4 are separate members. Moreover, the outer case 2 and the directivity controller 4 can be made of different materials since the outer case 2 and the directivity controller 4 are separate members. Accordingly, materials of the outer case 2 and the directivity controller 4 can be selected in accordance with desired characteristics.

Moreover, as shown in FIG. 17, an ultrasonic transducer 1 can be filled with silicon resin 9 or other suitable filler material. In this ultrasonic transducer 1, a bottom portion 2a and a side portion 2b of an outer case 2 are provided as separate members. Moreover, a back plate 5 includes a through-hole provided in a central portion thereof, and a lead wire 8 connected to a piezoelectric element 3 extends directly to the exterior via this through-hole. Foamable silicon resin 9 or other suitable material is charged inside the outer case 2 and a directivity controller 4. This silicon resin 9 absorbs unnecessary vibrations transmitted from the outer case 2. In this manner, components can be separately provided as required for their intended functions which enables the ultrasonic transducer 1 to be accurately produced at low cost (see Japanese Unexamined Patent Application Publication No. 2001-128292).

In an ultrasonic transducer, a bottom portion of an outer case is vibrated in response to the vibration of a piezoelectric element, and ultrasonic waves are radiated. When the ultrasonic waves are radiated, the vibrational energy leaks into a side portion of the outer case. When the vibrational energy leaks into the side portion of the outer case, the vibrational energy of the bottom portion is reduced, and the sound pressure of the ultrasonic waves radiated outward is reduced.

Furthermore, when a high-order spurious oscillation is generated in the outer case due to the vibrational energy that leaks into the side portion of the outer case, the oscillation of the outer case persists even when input of driving signals to the piezoelectric element is stopped. Such oscillation is referred to as reverberation. When the reverberation persists for a long period of time, the piezoelectric element continues to generate electrical signals in response to the vibration caused by the reverberation. With this, electrical signals based on the vibration of the piezoelectric element generated by the ultrasonic waves reflected from an obstacle are mixed with the electrical signals generated by the vibration caused by the reverberation, and the ultrasonic waves reflected from the obstacle cannot be detected. Such oscillation of the outer case can be absorbed to some extent using silicon resin or other suitable material charged inside the case. However, the unnecessary vibration cannot be sufficiently absorbed. In particular, when the end portion of the outer case is in direct contact with the silicon resin as shown in FIG. 17, the vibrational energy caused by the high-order spurious oscillation can be absorbed. However, since the end portion of the outer case is not in contact with the directivity controller, the leakage of the vibrational energy obtained by the piezoelectric element cannot be prevented. As a result, the sound pressure of the radiated ultrasonic waves is reduced.

Accordingly, the inventors of the present invention have tested an ultrasonic transducer including an inner case composed of a metallic material with a density higher than that of an outer case, which is disclosed in WO 2007/029559 A1. That is, a material with a high density has a high acoustic impedance, and such a material is not easily vibrated. Therefore, when the inner case is made of a material with a high acoustic impedance, the leakage of the vibrational energy into the side portion of the outer case is reduced, and the sound pressure of the radiated ultrasonic waves is increased. However, reverberation is still generated at the end portion of the outer case when the end portion of the outer case is not in contact with the inner case.

SUMMARY OF THE INVENTION

To overcome the problems described above, preferred embodiments of the present invention provide an ultrasonic transducer capable of radiating ultrasonic waves with a high sound pressure and having excellent reverberation characteristics.

An ultrasonic transducer according to a preferred embodiment of the present invention includes a cylindrical cap member with a bottom, a piezoelectric element provided on an inner bottom surface of the cap member, an inner frame made of a material having an acoustic impedance higher than the material of the cap member, and disposed inside the cap member so as to be in contact with a side portion, including an end portion, of the cap member, and a damper inserted into the inner frame so as to be in direct contact with at least a portion of the side portion of the cap member.

When the piezoelectric element provided on the inner bottom surface of the cylindrical cap member with a bottom is excited, the bottom portion of the cap member is vibrated, so that ultrasonic waves are radiated to the exterior. Since the inner frame is disposed inside the cap member so as to be in contact with the side portion, including the end portion, of the cap member, the vibration of side portion of the cap member can be regulated, and the leakage of the vibrational energy can be prevented. In particular, since the inner frame is made of a material having an acoustic impedance higher than that of the cap member, the effect of preventing the leakage of the vibrational energy can be enhanced. Furthermore, the damper is arranged so as to be in direct contact with at least a portion of the side portion of the cap member. As a result of this arrangement, the vibrational energy caused by the high-order spurious oscillation transmitted to the side portion of the cap member can be absorbed, and the reverberation can be regulated.

In this ultrasonic transducer, the damper can be in direct contact with the portion of the side portion of the cap member via through-holes provided in the inner frame.

Moreover, gaps can be provided partially between the cap member and the inner frame at the end portion of the cap member, and other dampers that are made of the same material as that of the damper inserted into the inner frame can be inserted into the gaps between the cap member and the inner frame.

The vibrational energy caused by the high-order spurious oscillation can be absorbed by the damper that is in direct contact with the side portion of the cap member inside the cap member.

An ultrasonic transducer according to another preferred embodiment of the present invention includes a cylindrical cap member with a bottom, a piezoelectric element provided on an inner bottom surface of the cap member, an inner frame made of a material having an acoustic impedance higher than the material of the cap member, and disposed inside the cap member so as to be in contact with a side portion, including an end portion, of the cap member, and dampers inserted into gaps, partially provided between the cap member and the inner frame at the end portion of the cap member, so as to be in contact with the inner side surface of the cap member.

When the gaps are partially provided between the cap member and the inner frame, it is not necessary to insert a damper inside the inner frame. Since the dampers are inserted into at least the gaps provided between the cap member and the inner frame so as to be in direct contact with the cap member, the vibrational energy caused by the high-order spurious oscillation can be absorbed.

In the ultrasonic transducer having the through-holes provided in the inner frame or in the ultrasonic transducer having the gaps partially provided between the cap member and the inner frame, the bottom portion of the cap member preferably includes a portion, not being in contact with an end of the inner frame, including a central portion of the cap member and a long axis extending along a certain direction, and the through-holes or the gaps are preferably provided in a side portion of the inner frame along the long-axis direction of the portion, not being in contact with the end of the inner frame, in the bottom portion of the cap member and along a direction orthogonal to the long-axis direction.

In the bottom portion of the cap member, a portion that is in contact with the end of the inner frame does not vibrate easily, and the portion that is not in contact with the end of the inner frame vibrates easily. Therefore, the ultrasonic waves are radiated when the easily vibrating portion of the cap member primarily vibrates. When the easily vibrating portion in the bottom portion of the cap member has a long axis, an anisotropy is generated in the ultrasonic waves, and a mode in which the cap member is elliptically deformed alternately along the long-axis direction and along the direction orthogonal to the long-axis direction. Since the through-holes are provided in the side portion of the inner frame or the gaps are provided between the cap member and the inner frame in the vicinity of the above-described significantly deformed portions of the cap member such that the damper(s) are in contact with the side portion of the cap member, the vibrational energy caused by the high-order spurious oscillation can be effectively regulated.

Furthermore, a curved portion can extend from the bottom portion to the side portion of the cap member, and an exterior component can be provided on the outer side surface of the cap member so as to cover the curved portion.

When the cap member is formed by drawing a flat plate, a curved portion is formed so as to extend from the bottom portion to the side portion of the cap member. When an ultrasonic transducer including such a cap member is attached to a bumper of an automobile, a gap is formed between the bumper and the cap member, and dust and dirt can easily accumulate in the gap. Such dust and dirt that accumulates in the gap can deteriorate the vibrational characteristics of the cap member, and in addition, the gap degrades the outward appearance of the automobile. Therefore, the exterior component is provided on the outer side surface of the cap member so as to cover the curved portion of the cap member. With this, no gap is formed when the ultrasonic transducer is attached to the automobile, and the deterioration in the characteristics and the degradation in the outward appearance are prevented.

Moreover, the damper can be arranged so as to extend from inside to outside the inner frame, and can be in direct contact with the outer side surface of the cap member.

A curved portion can extend from the bottom portion to the side portion of the cap member, and the damper disposed on the outer side surface of the cap member can cover the curved portion.

The damper is not necessarily in direct contact with the inner side surface of the cap member, and can be in direct contact with the outer side surface of the cap member. The vibrational energy caused by the high-order spurious oscillation can be absorbed when the damper is in direct contact with the side portion of the cap member in this manner.

Herein, when the cap member is formed using drawing or other suitable method, the damper arranged so as to cover the curved portion can prevent the formation of a gap between a portion to which the ultrasonic transducer is attached and the cap member.

In the above-described ultrasonic transducer, shoulders having a size corresponding to the thickness of the cap member can be provided on the outer side surface of the inner frame at the end portion of the cap member, and an external diameter of the inner frame outside the cap member can be greater than an external diameter of the inner frame inside the cap member such that no level difference exists between the cap member and the inner frame.

The cap member is preferably formed using drawing. Since deep drawing is a difficult processing technique, the cap member preferably is formed using shallow drawing. The vibration of the bottom portion of the shallowly drawn cap member generated by the piezoelectric element tends to leak into the side portion of the cap member. However, the side portion of the cap member is in contact with the damper, and at the same time, the side portion, including the end portion, of the cap member is in contact with the inner frame. In particular, the shoulders provided on the inner frame are engaged and in close contact with the end portion of the cap member such that the inner frame holds the end portion of the cap member. Thus, the leakage of the vibration into the side portion of the cap member can also be regulated in the shallowly drawn cap member, and the reverberation can be more effectively prevented.

Moreover, since no level difference occurs between the outer side surface of the cap member and that of the inner frame due to the shoulders provided on the inner frame having a size corresponding to the thickness of the cap member, i.e., the outer side surface of the cap member and that of the inner frame are on the same plane, the ultrasonic transducer can be easily attached to an automobile or other suitable vehicle, and furthermore, degradation in the outward appearance can be prevented.

Preferably, the inner frame made of a material having an acoustic impedance higher than that of the cap member is in contact with the side portion, including the end portion, of the cap member. With this configuration, the vibration of the side portion of the cap member can be regulated, and leakage of the vibrational energy of the bottom portion of the cap member caused by the piezoelectric element into the side portion can be prevented. Accordingly, the sound pressure of the ultrasonic waves radiated outward from the bottom portion of the cap member can be maintained at a high level. Furthermore, the damper is arranged so as to be in direct contact with at least a portion of the side portion of the cap member. With this configuration, the vibrational energy caused by the high-order spurious oscillation generated in the cap member can be absorbed, and the reverberation characteristics can be appropriately adjusted.

Other features, elements, processes, steps, characteristics and advantages of the present invention will become more apparent from the following detailed description of preferred embodiments of the present invention with reference to the attached drawings.

DETAILED DESCRIPTION OF THE PREFERRED EMBODIMENTS

Figure 1:
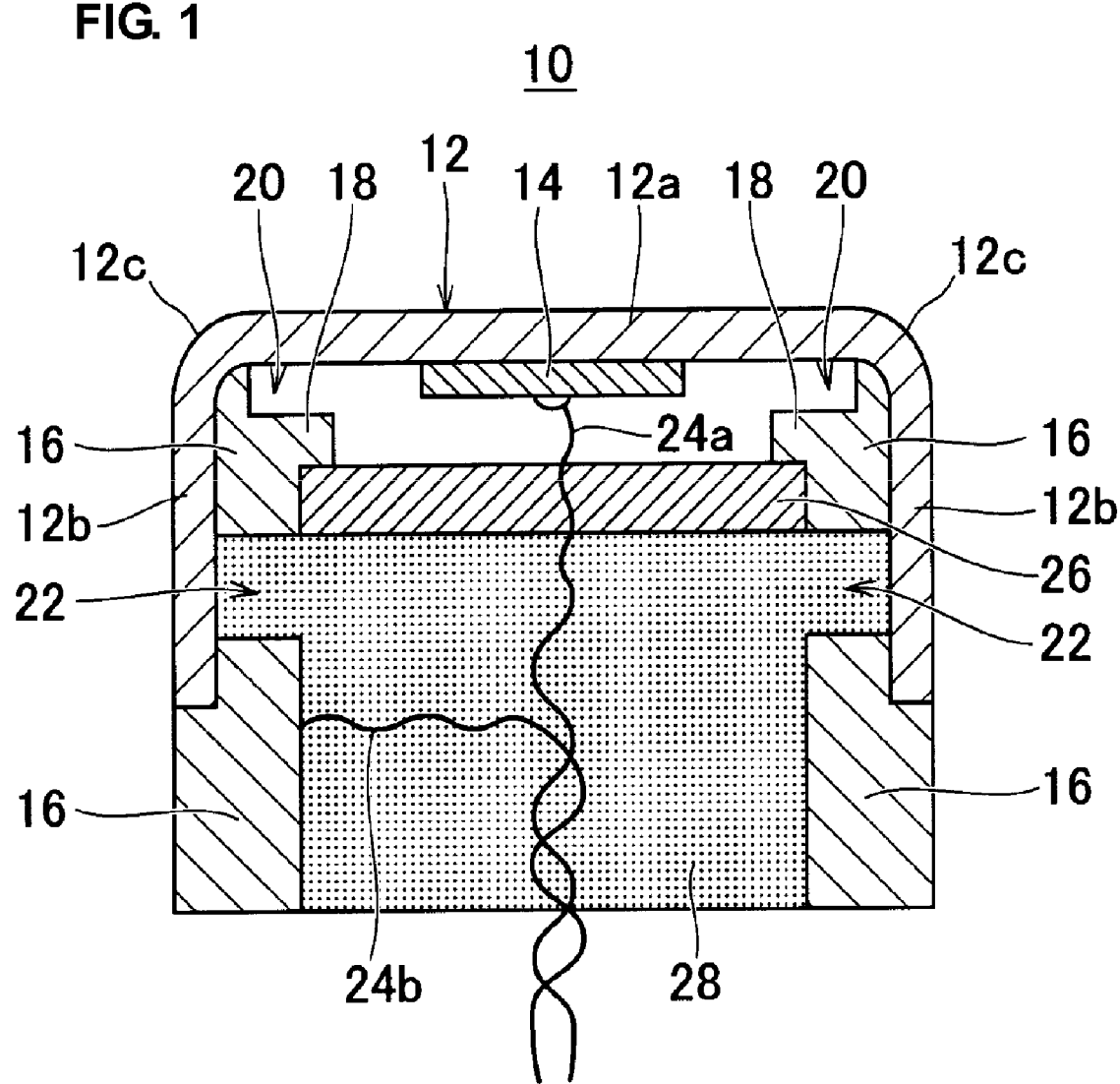
FIG. 1 illustrates an ultrasonic transducer according to a first preferred embodiment of the present invention.

FIG. 1 illustrates an ultrasonic transducer according to a preferred embodiment of the present invention. An ultrasonic transducer 10 includes a cylindrical cap member 12 having a bottom. The cap member 12 is made of a light weight material having high rigidity, such as aluminum, so as to be easily vibrated. The cap member 12 is configured so as to have a cylindrical shape with a bottom by drawing a flat plate of aluminum or other suitable material. The cap member 12 can be produced more easily using shallow drawing, and can be formed so as to have a cylindrical shape including a bottom portion 12a, a side portion 12b, and a curved portion 12c extending between the bottom portion 12a and the side portion 12b. The cap member 12 can be formed using other methods such as cutting, forging, and casting, for example.

A piezoelectric element 14 is provided on the inner surface of the bottom portion 12a of the cap member 12. The piezoelectric element 14 includes, for example, a disk piezoelectric substrate having electrodes provided on either surface thereof. One surface of the piezoelectric element 14 is bonded to the bottom portion 12a of the cap member 12 using a conductive adhesive or other suitable adhesive.

Figure 2:
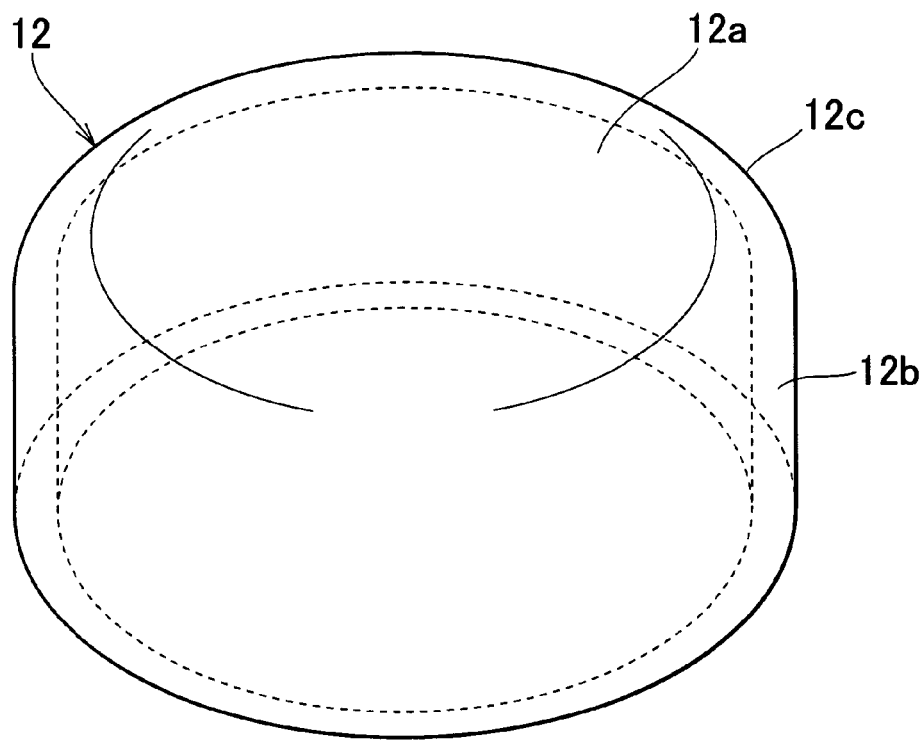
FIG. 2 is a perspective view illustrating a cap member and an inner frame of the ultrasonic transducer shown in FIG. 1.
Figure 2:
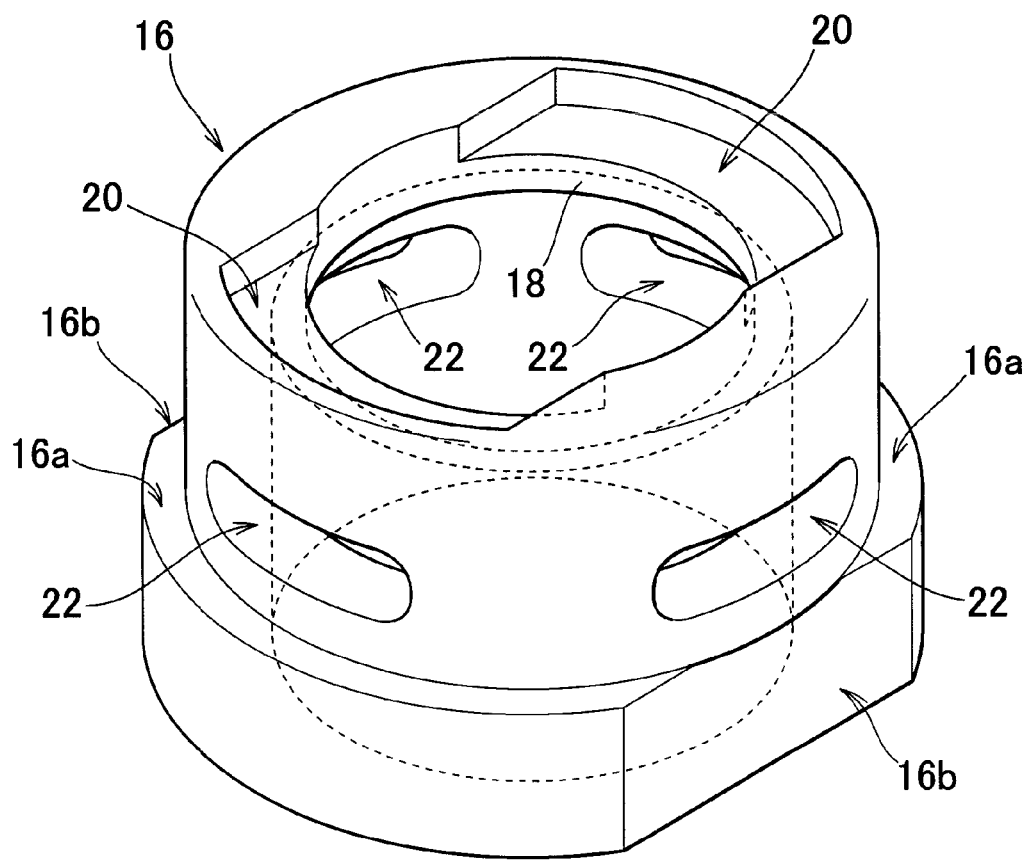

Furthermore, an inner frame 16 is provided inside the cap member 12. As shown in FIG. 2, the inner frame 16 has a cylindrical shape, and is fitted into the cap member 12 so as to be in contact with the inner surface of the cap member 12. The inner frame 16 includes a ring-shaped projecting portion 18 projecting inward at a portion adjacent to one end of the inner frame 16. The inner frame 16 further includes recessed portions 20 arranged so as to face each other at the one end of the inner frame 16 adjacent to the projecting portion 18. The inner frame 16 is fitted into the cap member 12 such that the side of the one end of the inner frame 16 adjacent to the projecting portion 18 faces the side of the bottom portion 12a of the cap member 12. Therefore, although the one end of the inner frame 16 is in contact with the bottom portion 12a of the cap member 12, the inner frame 16 is not in contact with the bottom portion 12a of the cap member 12 at the recessed portions 20 inside the cap member 12.

A portion of the inner frame 16 adjacent to the open end portion of the cap member 12 projects outward from the cap member 12. Shoulders 16a are provided on the inner frame 16 at positions corresponding to the end portion of the cap member 12. Accordingly, the diameter of the portion of the inner frame 16 fitted into the cap member 12 is relatively small and that of the portion projecting outward from the cap member 12 is relatively large. The size of the shoulders 16a corresponds to the thickness of the cap member 12. Therefore, the end portion of the cap member 12 is brought into contact with the inner frame 16, and no level difference exists between the surface of the cap member 12 and that of the inner frame 16. That is, the outer side surface of the cap member 12 and that of the inner frame 16 are on substantially the same plane. With this structure, the shoulders 16a of the inner frame 16 can be engaged and brought into close contact with the end portion of the cap member 12 such that the inner frame 16 holds the end portion of the cap member 12.

Moreover, flat portions 16b are provided on the side surface of the inner frame 16 at the portion projecting outward from the cap member 12 at positions having the recessed portions 20 provided in the one end of the inner frame 16 so as to face each other. The positions of the recessed portions 20 can be identified from outside the ultrasonic transducer 10 using the flat portions 16b.

Furthermore, a plurality of through-holes 22 communicating with the inner surface of the cap member 12 are provided in the inner frame 16. The through-holes 22 are arranged, for example, along the circumference of the side portion of the inner frame 16 at regular intervals. The through-holes 22 preferably are, for example, elongated holes. However, the through-holes 22 can be circular, rectangular, or other suitable shapes. The inner frame 16 is preferably made of a material having an acoustic impedance higher than that of the cap member 12. When the cap member 12 is made of aluminum, the inner frame 16 can be made of a material heavier and having a rigidity greater than that of aluminum, for example, zinc.

A lead wire 24a is connected to a second surface of the piezoelectric element 14. Moreover, another lead wire 24b is connected to the inner frame 16. The lead wire 24b is electrically connected to the one surface of the piezoelectric element 14 via the inner frame 16 made of zinc and the cap member 12 made of aluminum.

A sound absorber 26 is fitted into the stepped portion inside the projecting portion 18 in the inner frame 16. The sound absorber 26 is made of, for example, felt. The sound absorber 26 is disposed inside the projecting portion 18. Since the sound absorber 26 is disposed inside the projecting portion 18, a gap exists between the piezoelectric element 14 and the sound absorber 26 so as to ensure a vibrating space of the piezoelectric element 14. Furthermore, a damper 28 is inserted into the inner frame 16 in a space between the sound absorber 26 and the opening of the inner frame 16. The damper 28 is made of, for example, a foamable silicon resin. Herein, since the inner frame 16 includes the through-holes 22, the damper 28 is in direct contact with the inner side surface of the cap member 12 via the through-holes 22. The sound absorber 26 and the damper 28 absorb sound waves and vibration radiated inside the cap member 12 and the inner frame 16.

This ultrasonic transducer 10 is preferably attached to, for example, a bumper of an automobile, and is used as a back-up sonar device. When driving signals are input to the lead wires 24a and 24b, the piezoelectric element 14 is excited, and consequently, the bottom portion 12a of the cap member 12 is vibrated. When the bottom portion 12a of the cap member 12 is vibrated, ultrasonic waves are radiated along a direction orthogonal to the bottom portion 12a. The radiated ultrasonic waves are reflected from an obstacle, and received by the ultrasonic transducer 10. When the bottom portion 12a of the cap member 12 is vibrated in response to the received ultrasonic waves, the piezoelectric element 14 is also vibrated. The vibration of the piezoelectric element 14 is converted into electrical signals, and the signals are transmitted to a receiving circuit via the lead wires 24a and 24b. Thus, the distance from the ultrasonic transducer 10 to the obstacle can be calculated by measuring the time between the transmission and reception of the ultrasonic waves.

In this ultrasonic transducer 10, a portion of the bottom portion 12a of the cap member 12, the one end of the inner frame 16 being in contact with the portion, is not easily vibrated. In contrast, another portion of the bottom portion 12a of the cap member 12 facing the recessed portions 20, the inner frame 16 not being in contact with the portion, is easily vibrated. Therefore, the width of the portion that is easily vibrated is changed in accordance with the orientation of the bottom portion 12a of the cap member 12. The expansion of the radiated ultrasonic waves is relatively large when the width of the portion that is easily vibrated in the bottom portion 12a of the cap member 12 is relatively small, whereas the expansion of the radiated ultrasonic waves is relatively small when the width of the portion that is easily vibrated in the bottom portion 12a of the cap member 12 is relatively large. Therefore, when directions along which the recessed portions 20 are sandwiched, i.e., directions to the surfaces of the flat portions 16b provided on the inner frame 16, are parallel to the width direction of an automobile, ultrasonic waves propagate along the width direction of the automobile without propagating along the vertical direction. In this manner, the directivity of the ultrasonic transducer 10 can be adjusted by providing the recessed portions 20 in the inner frame 16. Thus, obstacles disposed along the width direction of the automobile can be detected, and those disposed along the vertical direction such as tire stops on a road surface are not detected by adjusting the directivity of the ultrasonic transducer 10 as described above. The ultrasonic transducer 10 can be attached with a desired directivity thereof using the flat portions 16b provided on the side surface of the inner frame 16.

Moreover, in the ultrasonic transducer 10, the inner frame 16 made of a material having a high acoustic impedance, i.e., a material that is not easily vibrated, is fitted into the cap member 12 so as to be in contact with the inner side surface of the cap member 12. Therefore, the vibration of the side portion 12b of the cap member 12 is regulated. As a result, less vibrational energy of the bottom portion 12a of the cap member 12 leaks into the side portion 12b, and the sound pressure of the ultrasonic waves radiated from the bottom portion 12a can be maintained at a high level. In particular, since the inner frame 16 is also in contact with the end portion of the cap member 12 and the shoulders 16a of the inner frame 16 hold the end portion of the cap member 12, the vibration of the end portion of the cap member 12, which is easily vibrated, can be regulated, and the leakage of the vibrational energy can be effectively reduced.

Furthermore, when the bottom portion 12a of the cap member 12 is vibrated by the piezoelectric element 14, a high-order spurious oscillation is generated, and the cap member 12 continues to vibrate even after the input of the driving signals for driving the piezoelectric element 14 is stopped. When such reverberation persists for a long period of time, the piezoelectric element 14 continues to generate electrical signals in response to the vibration caused by the reverberation. With this, electrical signals based on the vibration of the piezoelectric element generated by the ultrasonic waves reflected from an obstacle are drowned out by the electrical signals of the vibration caused by the reverberation, and the ultrasonic waves reflected from the obstacle cannot be detected. However, in the ultrasonic transducer 10, the damper 28 is in direct contact with the side portion 12b of the cap member 12 via the through-holes 22 provided in the inner frame 16, and the vibrational energy caused by the high-order spurious oscillation of the cap member 12 is absorbed by the damper 28. Thus, the reverberation characteristics of the ultrasonic transducer 10 can be appropriately suppressed.

In this manner, ultrasonic waves with a high sound pressure can be radiated using the inner frame 16 that is made of a material having a high acoustic impedance and is in contact with the inner side surface of the cap member 12, and the reverberation characteristics can be appropriately suppressed using the damper 28 that is in direct contact with portions of the inner side surface of the cap member 12.

Figure 3:
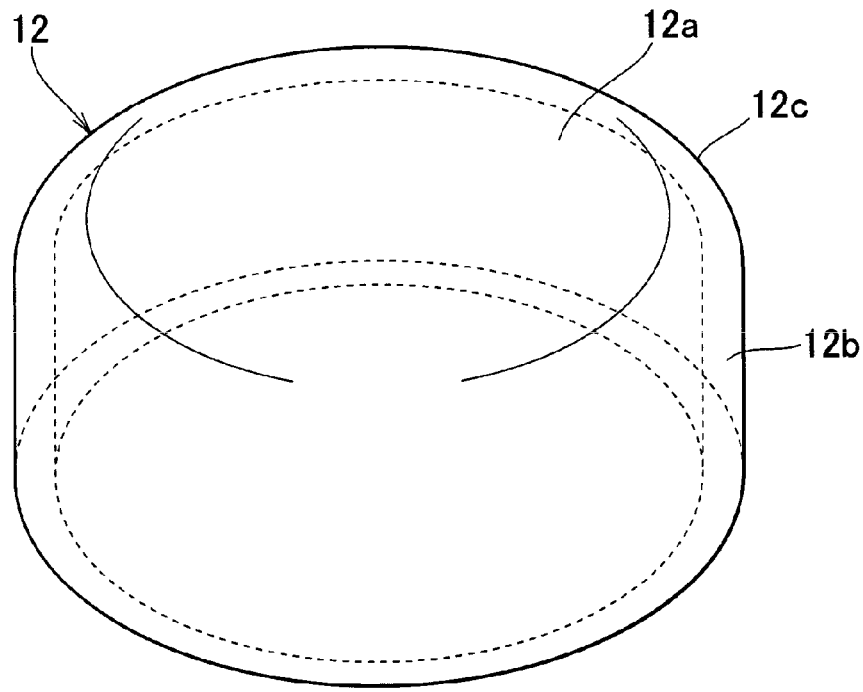
FIG. 3 is a perspective view illustrating a cap member and an inner frame of an ultrasonic transducer according to a second preferred embodiment of the present invention.
Figure 3:
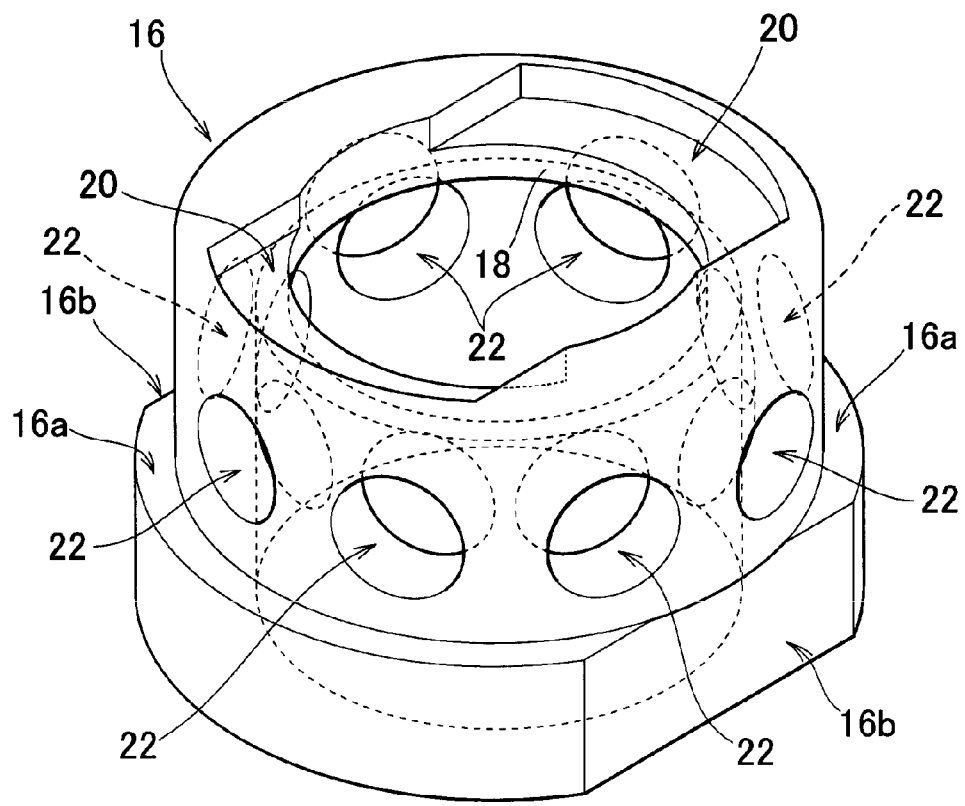

As shown in FIG. 3, circular through-holes 22 are provided along the circumference of the side portion of the inner frame 16 at regular intervals. The vibrational energy caused by the high-order spurious oscillation of the cap member 12 is absorbed by the damper 28 due to the direct contact of the damper 28 with the inner side surface of the cap member 12 via the through-holes 22 regardless of the shape of the through-holes 22.

Figure 4:
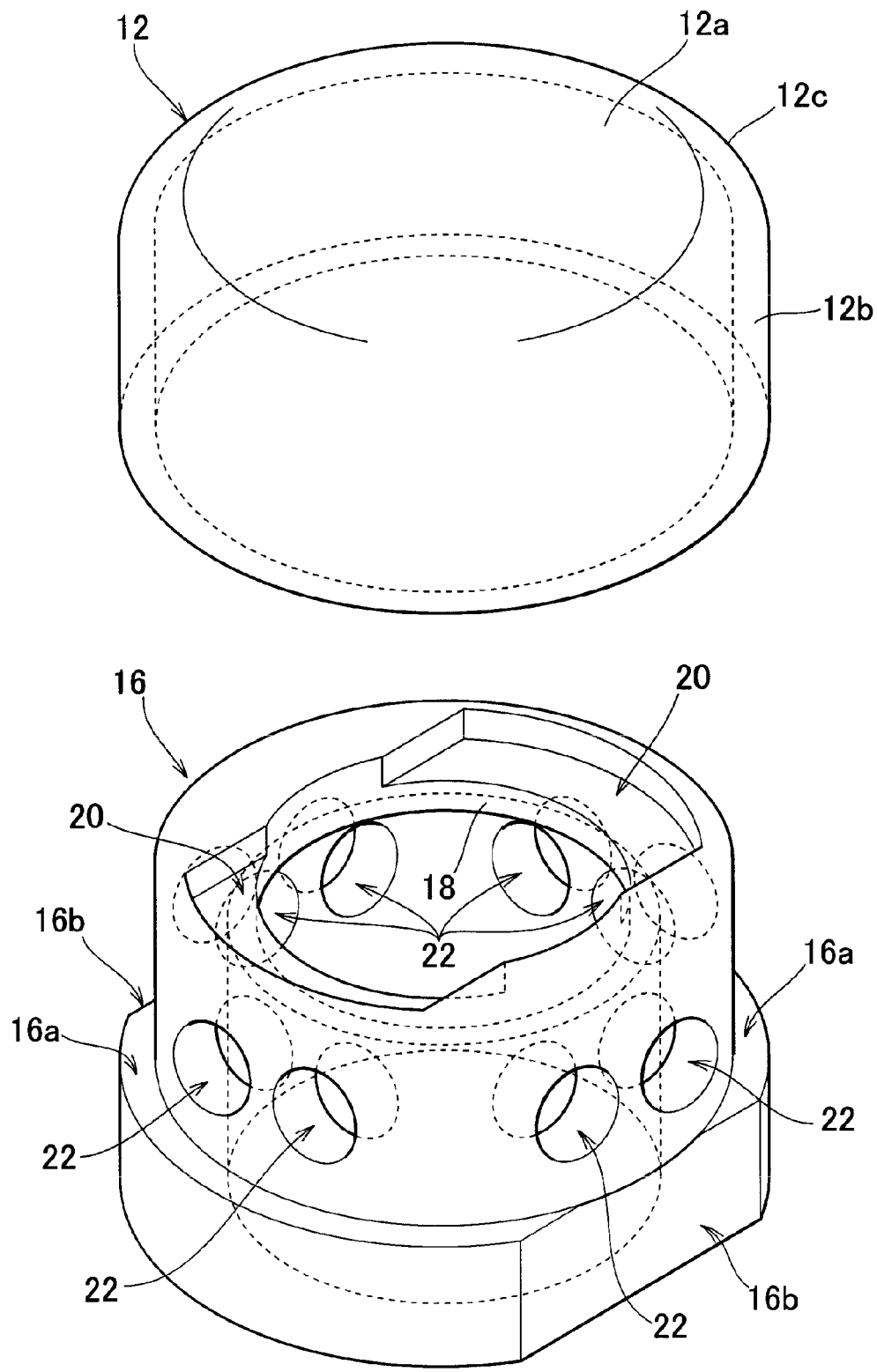
FIG. 4 is a perspective view illustrating a cap member and an inner frame of an ultrasonic transducer according to a third preferred embodiment of the present invention.

Herein, the through-holes 22 are not necessarily provided in the side portion of the inner frame 16 at regular intervals. In particular, as shown in FIG. 4, through-holes 22 are preferably provided in the side portion of the inner frame 16 at positions corresponding to the recessed portions 20 provided in the one end of the inner frame 16 so as to face each other and at positions along a direction orthogonal to a direction connecting the recessed portions 20. With this arrangement, the through-holes 22 can be located in the side portion of the inner frame 16 along the long-axis direction thereof, not being in contact with the inner frame 16, in the bottom portion of the cap member 12 and along a direction orthogonal to the long-axis direction.

Figure 5A:
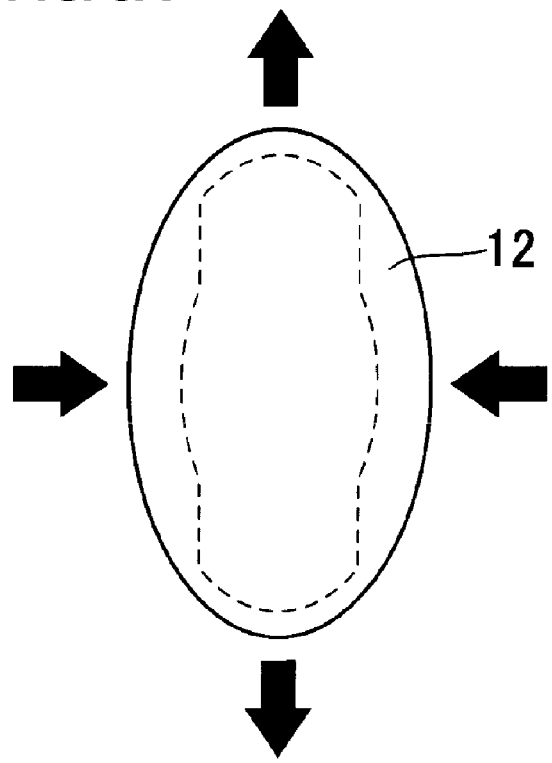
FIGS. 5A and 5B illustrate a deformation mode of the cap member in the ultrasonic transducer according to preferred embodiments of the present invention.
Figure 5B:
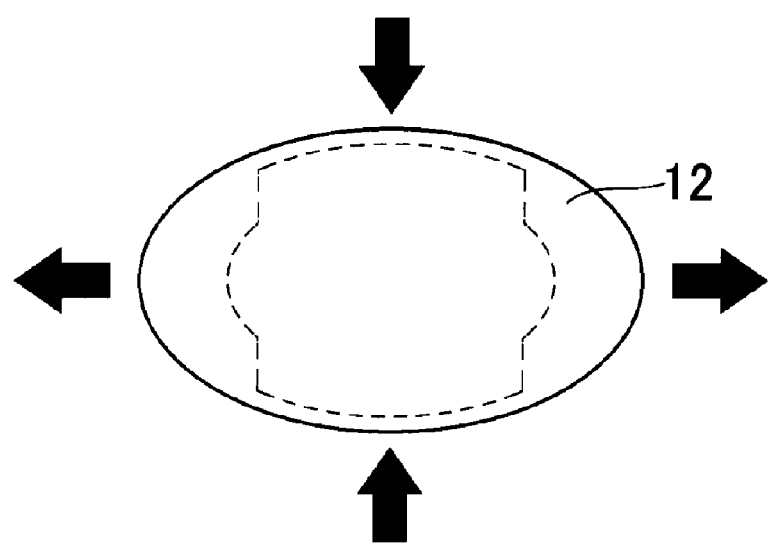

The portion, not being in contact with the inner frame 16, in the bottom portion of the cap member 12 easily vibrates as described above. This easily vibrated portion in the bottom portion of the cap member 12 includes a central portion in the bottom portion of the cap member 12, and at the same time, includes a long axis. With this structure, an anisotropy is generated in the vibrating area in the bottom portion of the cap member 12. That is, a length of the vibrating area of the easily vibrating portion in the bottom portion of the cap member 12 along the long-axis direction is wider and the vibrating area along the direction orthogonal to the long-axis direction is narrower. This causes an anisotropy in the vibrating surface of the cap member 12, and thus, the radiated ultrasonic waves are flattened. In this manner, vibration is significantly transmitted to, in particular, the easily vibrating portion along the long-axis direction and along the direction orthogonal to the long-axis direction instead of being concentrically transmitted to the bottom portion and the side portion of the cap member 12 in an equal manner due to the anisotropy generated in the vibrating surface of the cap member 12. With this, a mode in which the cap member 12 is deformed alternately along the long-axis direction and along the direction orthogonal to the long-axis direction is generated. FIGS. 5A and 5B illustrate the shapes of the deformed cap member 12 in an exaggerated manner such that the deformation mode of the cap member 12 can be understood. As shown in FIGS. 5A and 5B, a mode is generated such that the cap member 12 is elliptically deformed alternately along the long-axis direction of the easily vibrating portion of the cap member 12 and along the direction orthogonal to the long-axis direction.

Accordingly, the through-holes 22 are provided in the side portion of the inner frame 16 at positions facing significantly deformed portions of the side portion of the cap member 12, i.e., positions along the long-axis direction of the easily vibrating portion in the bottom portion of the cap member 12 and along the direction orthogonal to the long-axis direction. Therefore, the damper 28 is brought into contact with the side portion of the cap member 12 at positions corresponding to the significantly deformed portions of the cap member 12. With this, the vibrational energy caused by the high-order spurious oscillation can be more effectively regulated, and the reverberation can be suppressed. In this manner, the reverberation characteristics are improved more effectively by providing the through-holes 22 in the side portion of the inner frame 16 along the long-axis direction of the easily vibrating portion in the bottom portion of the cap member 12 and along the direction orthogonal to the long-axis direction.

Figure 6:
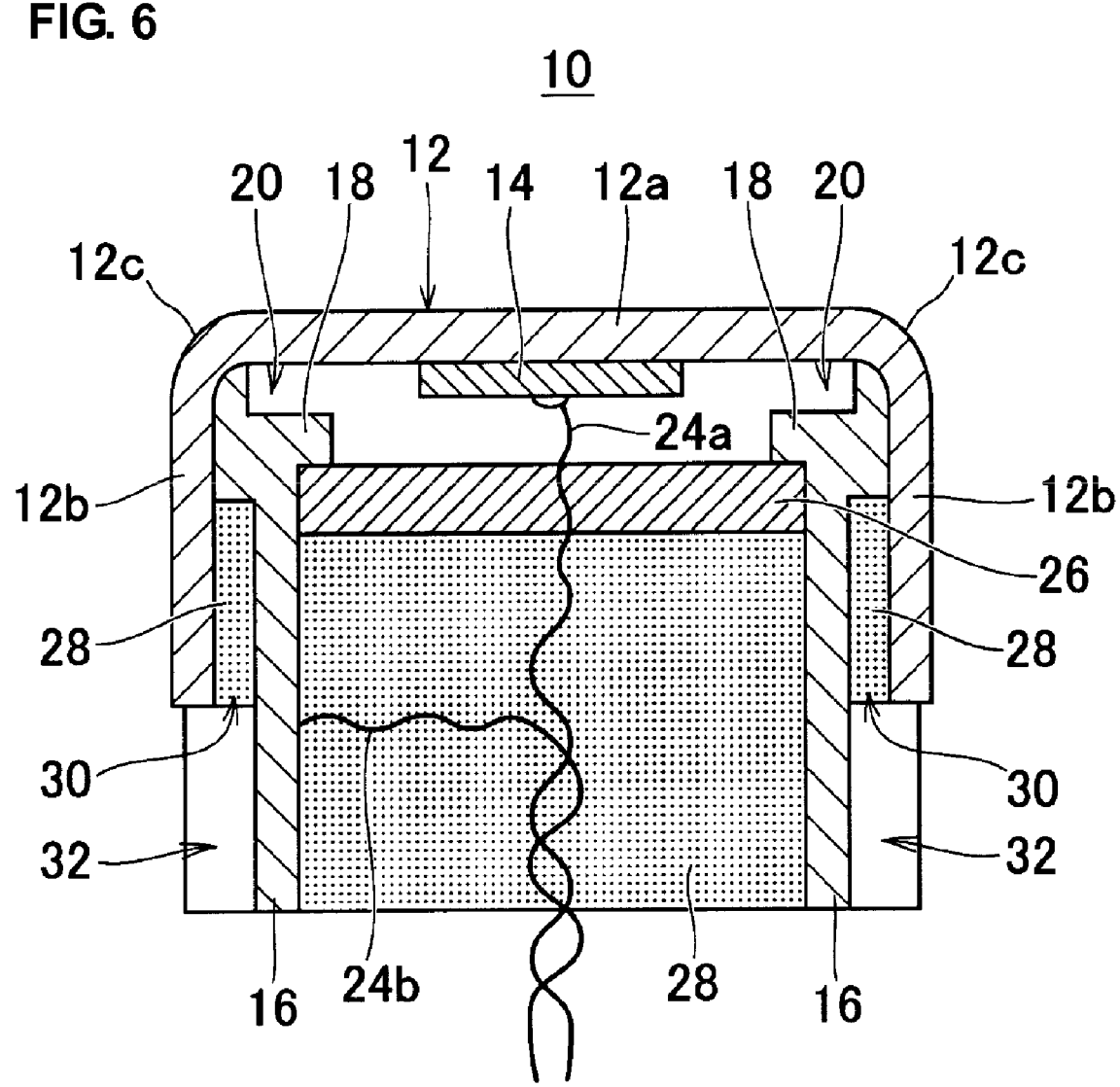
FIG. 6 illustrates an ultrasonic transducer according to a fourth preferred embodiment of the present invention.
Figure 7:
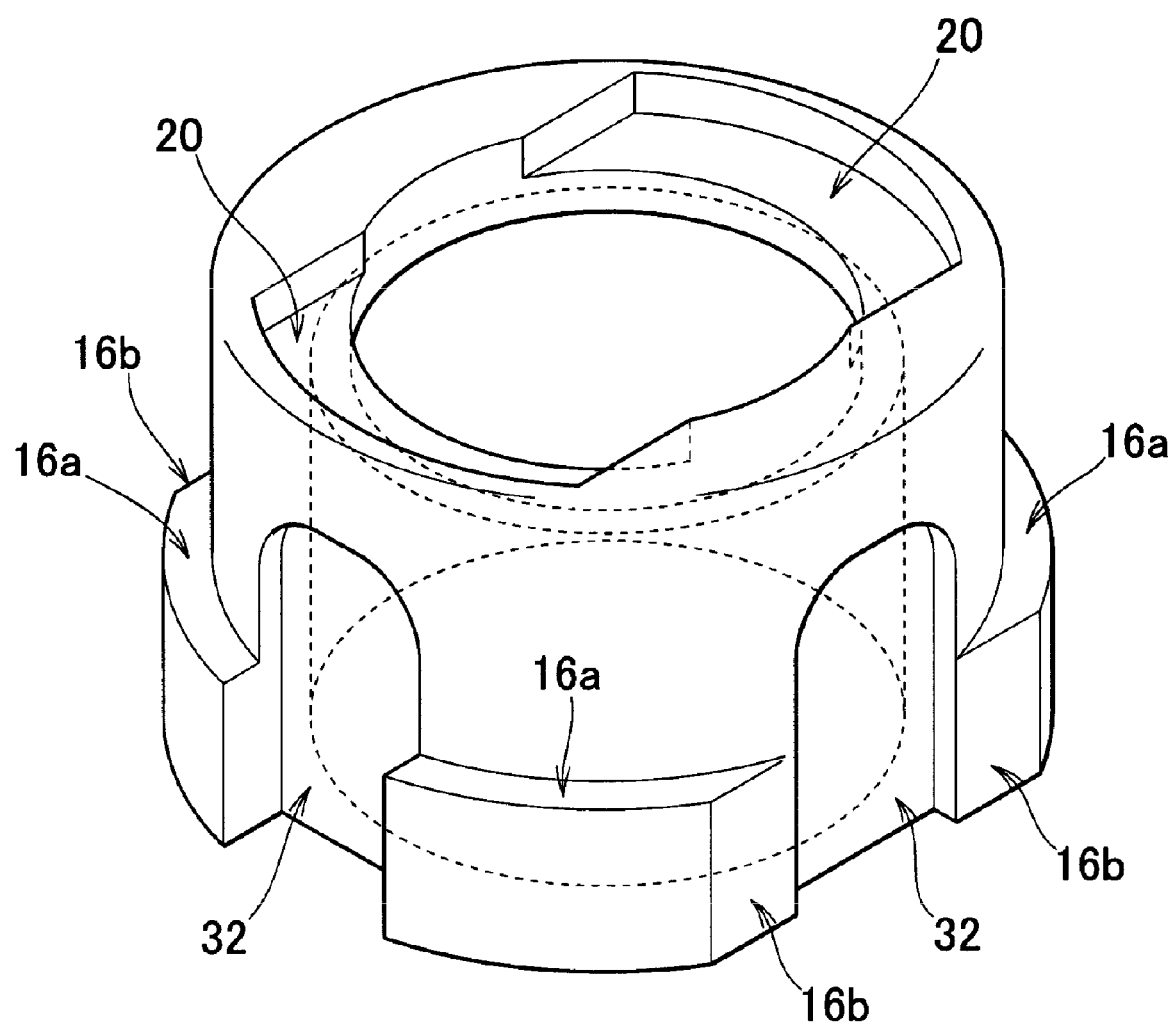
FIG. 7 is a perspective view illustrating an inner frame of the ultrasonic transducer shown in FIG. 6.

Moreover, as shown in FIG. 6, gaps 30 extending from the end portion of the cap member 12 toward the bottom portion 12a can be provided between the side portion 12b and the inner frame 16, and other dampers 28 can be inserted into these gaps 30. In order to form such gaps 30, groove portions 32 are provided on the outer side surface of the inner frame 16 so as to extend from the end portion of the inner frame 16 along the axial direction as shown in FIG. 7. Four groove portions 32, for example, are provided along the circumference of the inner frame 16 at regular intervals. The gaps 30 are disposed between the side portion 12b of the cap member 12 and the inner frame 16 at the open end portion of the cap member 12 by fitting the inner frame 16 into the cap member 12.

The leakage of the vibrational energy to the side portion 12b of the cap member 12 can also be reduced in this ultrasonic transducer 10 since the inner frame 16 is in contact with the cap member 12 up to the end portion of the cap member 12 at portions other than the groove portions 32. Thus, the sound pressure of the ultrasonic waves radiated from the ultrasonic transducer 10 can be maintained at a high level. Moreover, the gaps 30 are provided between the side portion 12b of the cap member 12 and the inner frame 16 at the positions at which the groove portions 32 are provided in the inner frame 16, and the dampers 28 are inserted into the gaps 30. The vibrational energy caused by the high-order spurious oscillation of the cap member 12 is absorbed by the dampers 28. Accordingly, the reverberation characteristics of the ultrasonic transducer 10 can be appropriately suppressed, and the ultrasonic waves reflected from obstacles can be effectively detected. The material of the damper 28 inserted into the inner frame 16 and that of the dampers 28 inserted into the gaps 30 can differ from each other as required. Furthermore, when the dampers 28 are inserted into the gaps 30, the vibrational energy caused by the high-order spurious oscillation of the cap member 12 is absorbed by the dampers 28 in the gaps 30. Therefore, no damper is required to be inserted into the inner frame 16.

In this ultrasonic transducer 10, it is also preferable that the groove portions 32 be provided in the side portion of the inner frame 16 along the long-axis direction of the portion, not being in contact with the inner frame 16, in the bottom portion of the cap member 12 and along the direction orthogonal to the long-axis direction. When the groove portions 32 are provided at these positions, the gaps 30 can be disposed between the cap member 12 and the inner frame 16 at positions corresponding to the significantly bent positions of the vibrating portions of the cap member 12. Thus, the vibrational energy caused by the high-order spurious oscillation of the cap member 12 is effectively absorbed by the dampers 28 inserted into the gaps 30.

Figure 8:
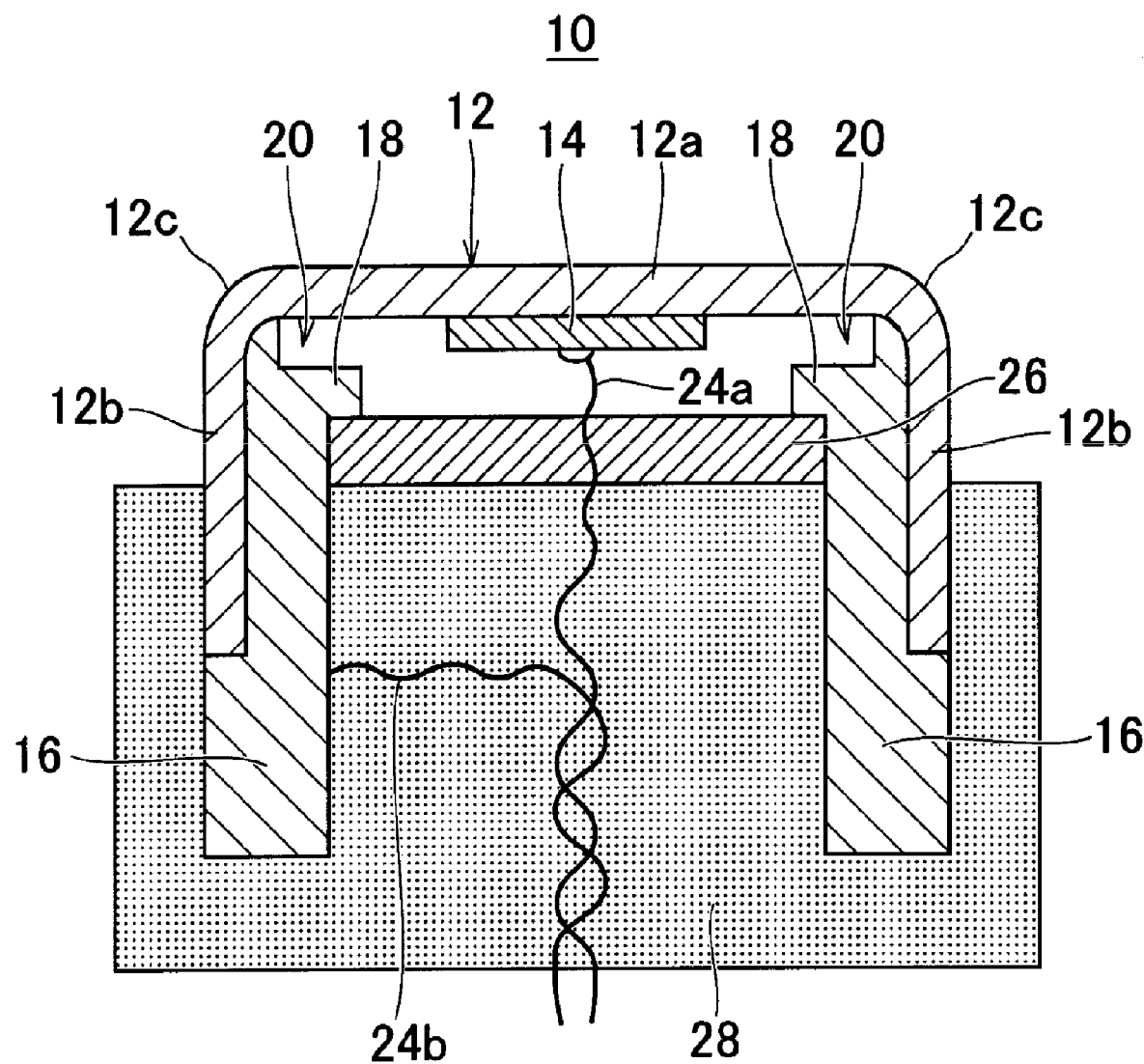
FIG. 8 illustrates an ultrasonic transducer according to a fifth preferred embodiment of the present invention.

Moreover, as shown in FIG. 8, the damper 28 inserted into the inner frame 16 can be extended to the outer side surfaces of the cap member 12 and the inner frame 16 over the end portion of the inner frame 16. In this ultrasonic transducer 10, the damper 28 is in contact with the outer surface of the side portion 12b of the cap member 12. The vibrational energy caused by the high-order spurious oscillation of the cap member 12 can also be absorbed when the damper 28 is in direct contact with the outer surface of the side portion 12b of the cap member 12 in this manner, and the reverberation characteristics can be appropriately suppressed. The inner frame 16 is in contact with the cap member 12 up to the end portion of the cap member 12 inside the cap member 12, and the vibration of the cap member 12 at the end portion thereof can be regulated. Thus, the leakage of the vibrational energy can be effectively prevented.

The damper 28 at the outer side of the side portion 12b of the cap member 12 can be configured so as to cover the entire side portion 12b of the cap member 12. When the ultrasonic transducer 10 is attached to an automobile or other suitable vehicle, an exterior component made of rubber or other suitable material is usually disposed so as to cover the side surface of the ultrasonic transducer 10. Accordingly, when the damper 28 is configured so as to cover the outer side surface of the ultrasonic transducer 10, the damper 28 can absorb unnecessary vibration of the cap member 12, and at the same time, can function as the exterior component.

Figure 9:
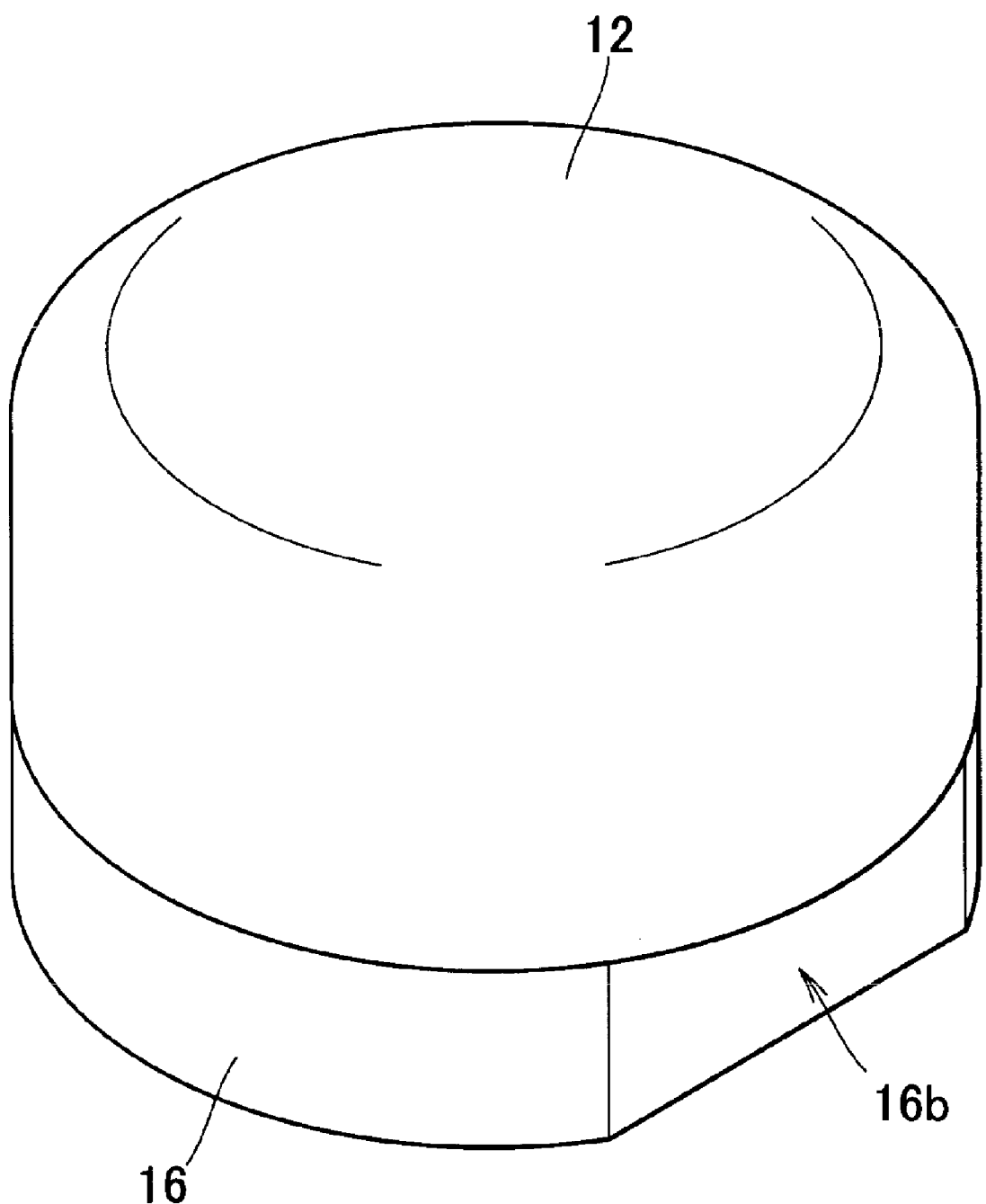
FIG. 9 is a perspective view illustrating an ultrasonic transducer according to a sixth preferred embodiment of the present invention.

Moreover, in the above-described ultrasonic transducers 10 shown in FIGS. 2 to 4 and FIG. 7, the shoulders 16a are disposed on the side surface of the inner frame 16. When the inner frame 16 is fitted into the cap member 12, the end portion of the cap member 12 can be held by the shoulders 16a of the inner frame 16, and at the same time, no level difference occurs between the cap member 12 and the inner frame 16 as shown in FIG. 9. Accordingly, the vibration of the end portion of the cap member 12 can be regulated such that the leakage of the vibrational energy is prevented, and at the same time, the outward appearance of the ultrasonic transducer 10 is improved. Furthermore, when the shoulders 16a are disposed on the inner frame 16 so as to reduce the height of the side portion 12b of the cap member 12, the rigidity of the side portion 12b is increased, and the side portion 12b becomes more difficult to vibrate. Moreover, when the height of the side portion 12b of the cap member 12 is reduced, the volume ratio of the inner frame 16, which is not easily vibrated, is increased, and the vibration can be more effectively regulated.

Figure 10:
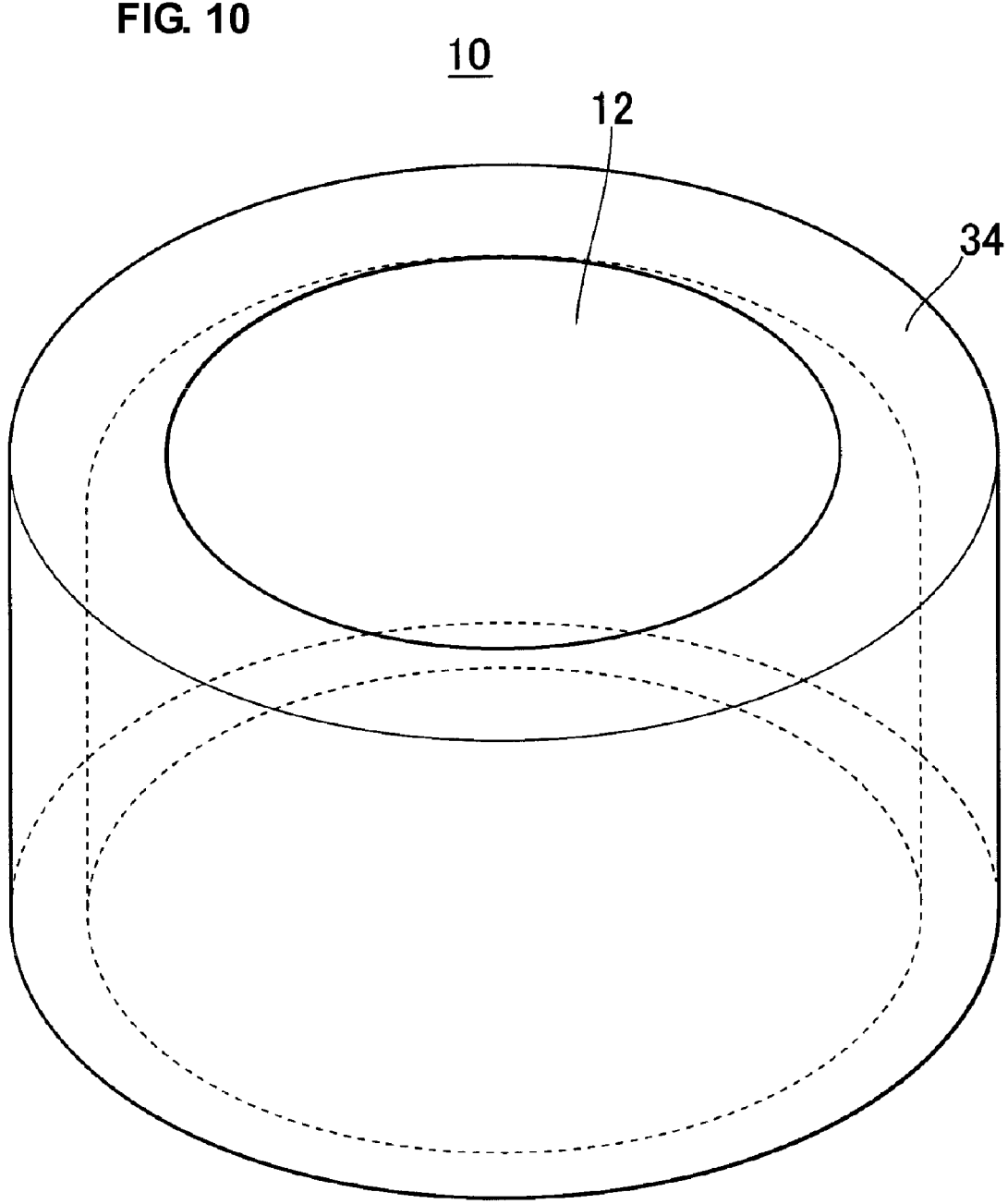
FIG. 10 is a perspective view illustrating an ultrasonic transducer according to a seventh preferred embodiment of the present invention.
Figure 11:
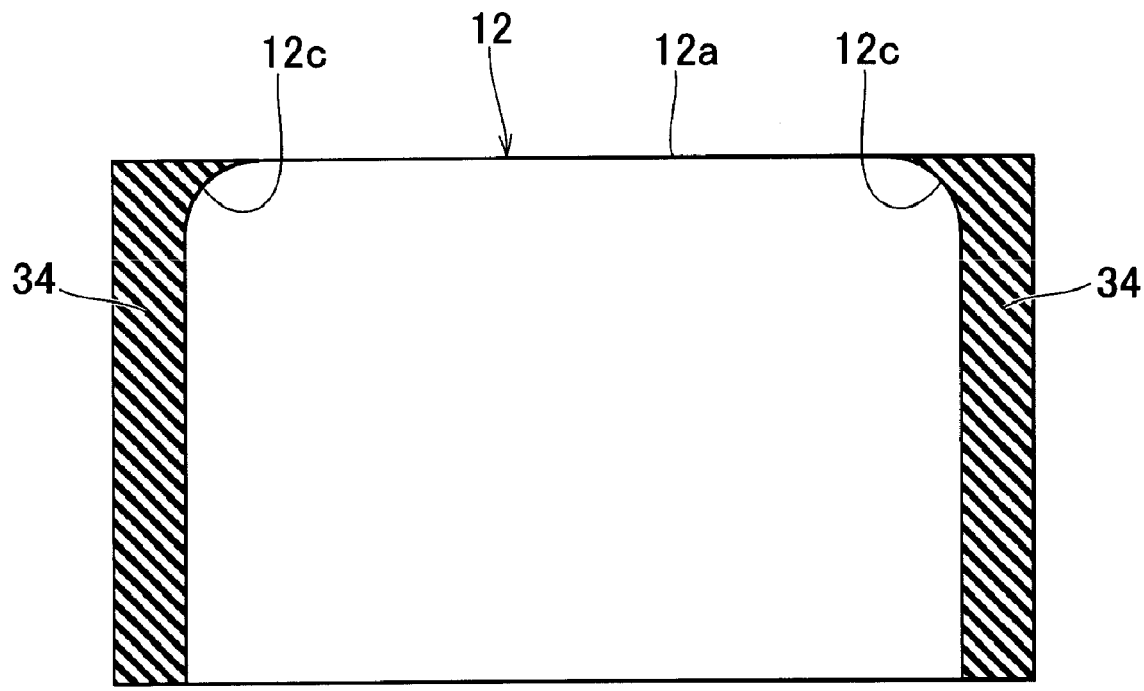
FIG. 11 illustrates the ultrasonic transducer shown in FIG. 10.

As described above, when the ultrasonic transducer 10 is attached to an automobile or other suitable vehicle, an external component made of rubber or other suitable material is disposed so as to cover the side surfaces of the cap member 12 and the inner frame 16. When an exterior component 34 is configured so as to cover the entire side surface of the ultrasonic transducer 10 such that the exterior component 34 is in contact with the curved portion 12c of the cap member 12 as shown in FIGS. 10 and 11, no gap exists between the cap member 12 and the exterior component 34. Therefore, when the ultrasonic transducer 10 is attached to a bumper of an automobile, for example, no gap exists between the cap member 12 and the bumper. When a gap exists between the cap member 12 and the bumper, dust and dirt can be easily accumulated in the gap. This can cause detrimental effects on the characteristics of the ultrasonic transducer 10. The gap also degrades the outward appearance of the ultrasonic transducer, and accordingly, the automobile. Such a gap can be eliminated by forming the exterior component 34 so as to cover the curved portion 12c of the cap member 12. With this, the deterioration in the characteristics and the outward appearance is prevented. Moreover, when the damper 28 is disposed on the entire side surface of the ultrasonic transducer, it is preferable that the damper 28 is also configured so as to cover the curved portion 12c of the cap member 12 in the ultrasonic transducer 10 covered with the damper 28 as shown in FIG. 8.

As described above, the inner frame 16 made of a material having an acoustic impedance greater than that of the cap member 12 is fitted into the cap member 12 in the ultrasonic transducer 10 according to preferred embodiments of the present invention. Since the inner frame 16 is in contact with the side portion 12b of the cap member 12 up to the end portion of the cap member 12, the leakage of the vibrational energy can be regulated and the sound pressure of the radiated ultrasonic waves can be maintained at a high level. Furthermore, since the damper 28 is in direct contact with at least a portion of the side portion 12b of the cap member 12, the vibrational energy caused by the high-order spurious oscillation of the cap member 12 can be absorbed, and the reverberation characteristics can be appropriately suppressed.

EXAMPLE 1

Figure 12:
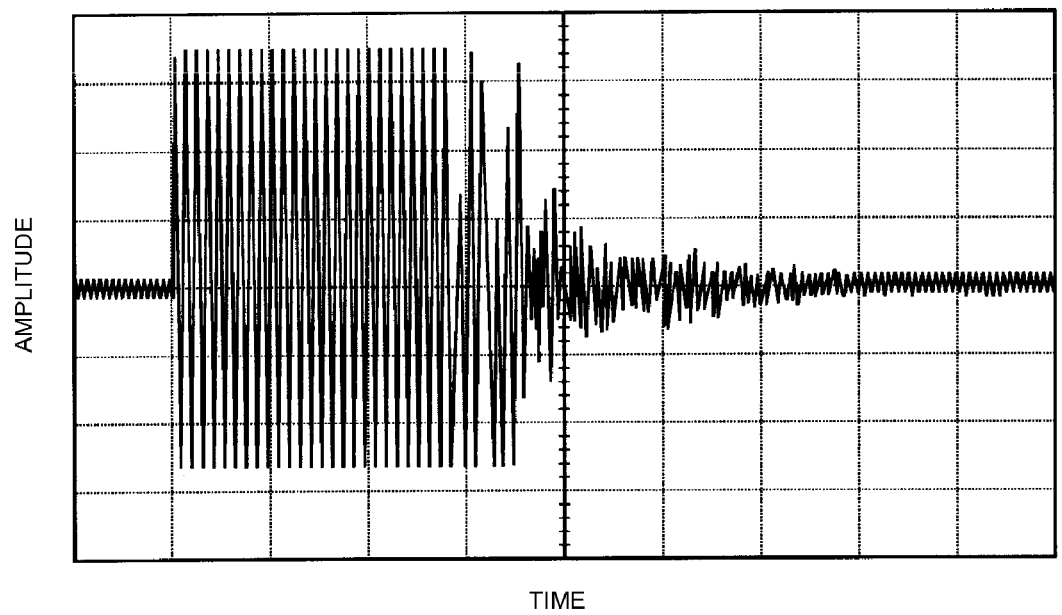
FIG. 12 illustrates the reverberation characteristics of the ultrasonic transducer including the cap member and the inner frame shown in FIG. 3.
Figure 13:
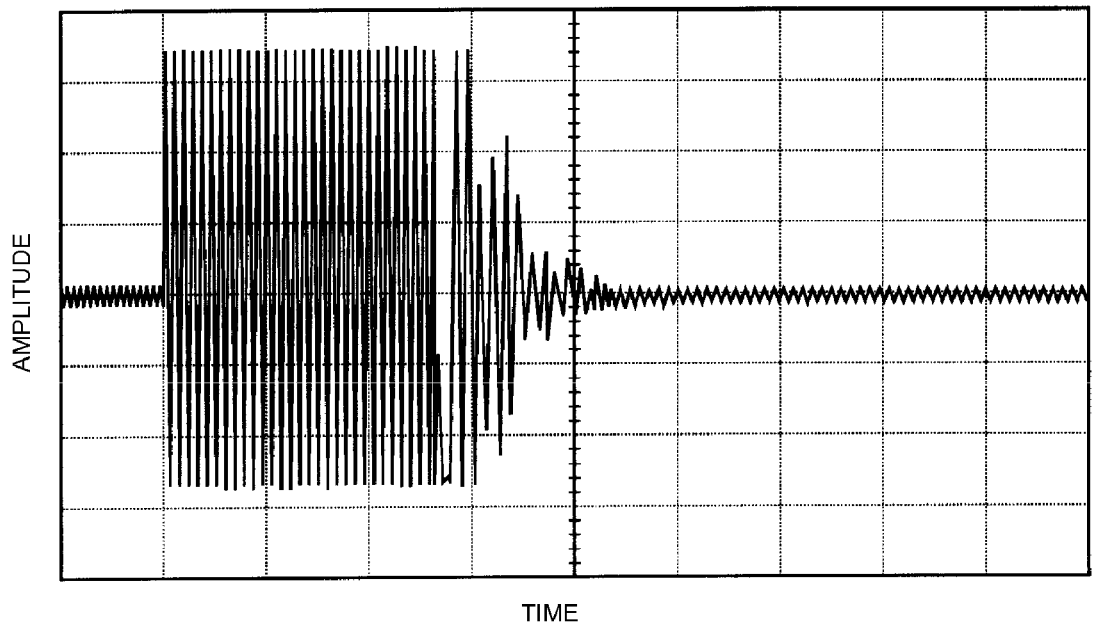
FIG. 13 illustrates the reverberation characteristics of the ultrasonic transducer including the cap member and the inner frame shown in FIG. 4.
Figure 14:
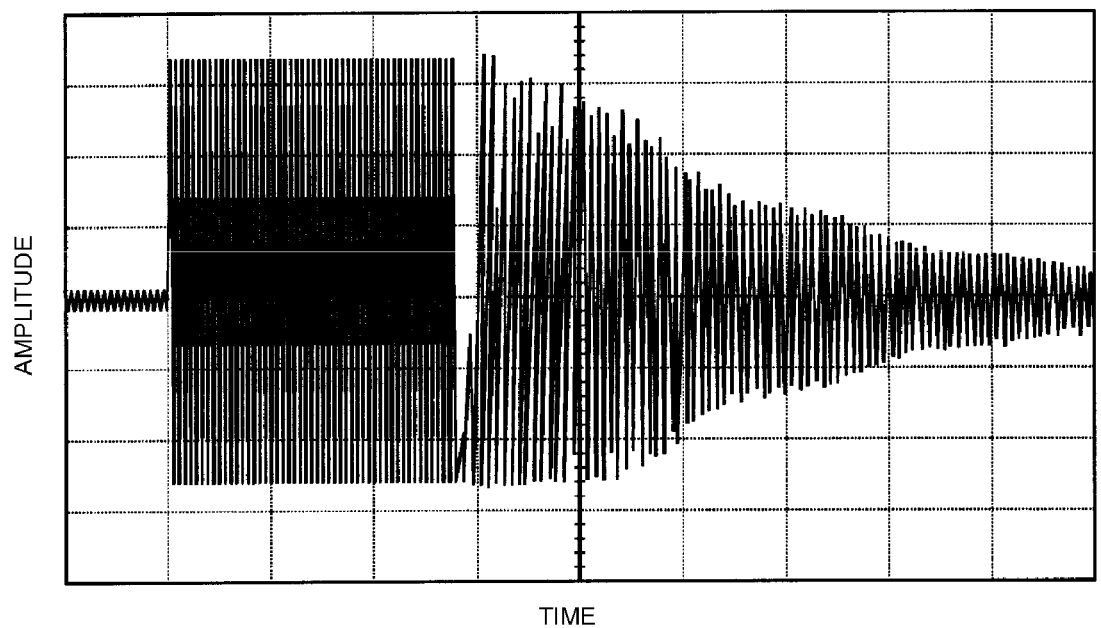
FIG. 14 illustrates the reverberation characteristics of an ultrasonic transducer including an inner frame having no through-holes.
Figure 15:
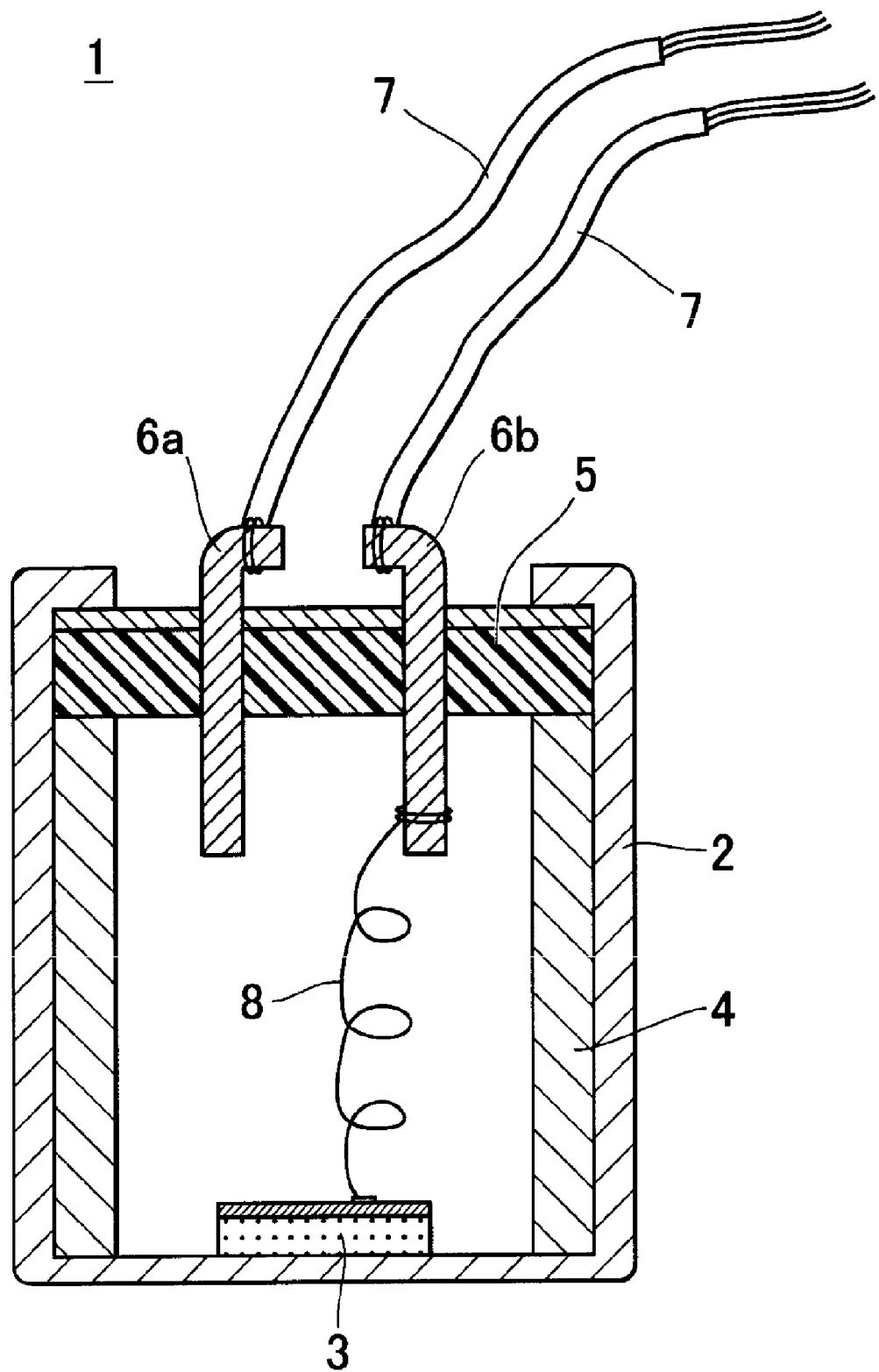
FIG. 15 illustrates an example of a known ultrasonic transducer serving as a background of the present invention.
Figure 16:
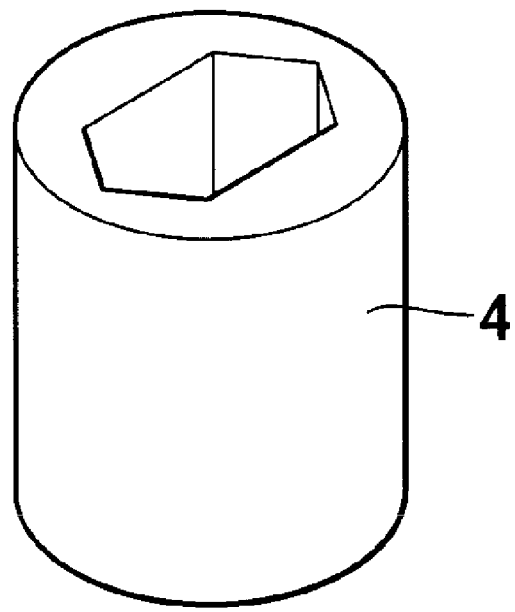
FIG. 16 is a perspective view illustrating an outer case and a directivity controller of the ultrasonic transducer shown in FIG. 15.
Figure 16:
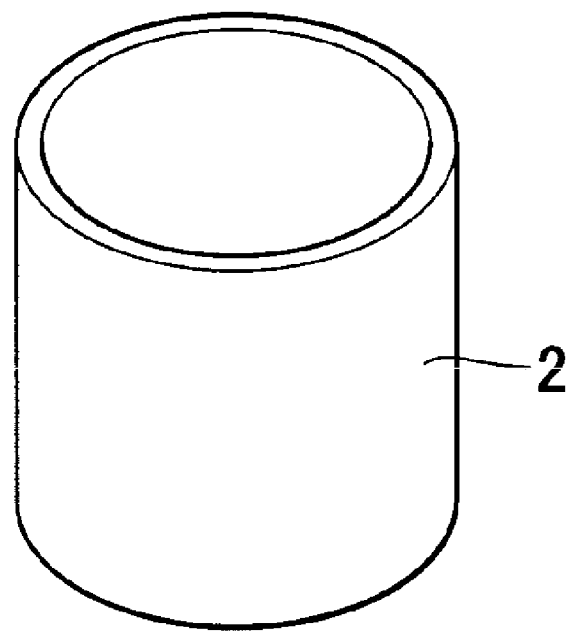
Figure 17:
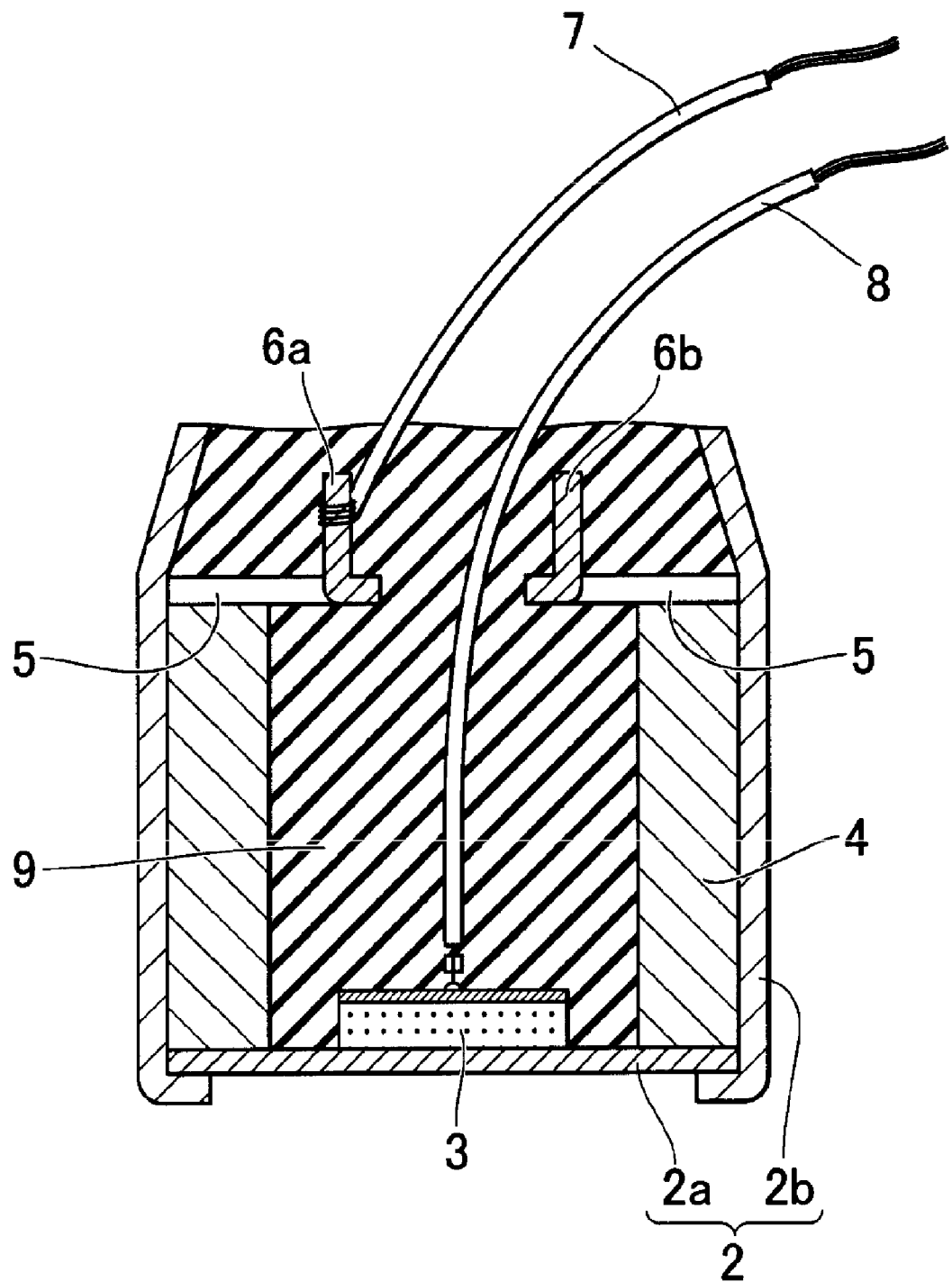
FIG. 17 illustrates another example of a known ultrasonic transducer serving as a background of the present invention.

Ultrasonic transducers including cap members and inner frames as shown in FIGS. 3 and 4 were produced as Examples 1 and 2, respectively. Moreover, an ultrasonic transducer including an inner frame having the same shape as those shown in FIGS. 3 and 4 and having no through-holes was produced as a comparative example. The reverberation characteristics of these ultrasonic transducers were measured by applying a voltage of about 60 V to piezoelectric elements during a driving time of about 0.60 ms. The results of Example 1, Example 2, and the comparative example are shown in FIGS. 12 to 14, respectively. In FIGS. 12 to 14, the abscissa is divided into 0.2 ms sections.

The time periods from when the driving voltage was applied to when the reverberation was attenuated were about 0.78 ms, about 0.69 ms, and about 1.23 ms in Example 1, Example 2, and the comparative example, respectively. The results show that the reverberation characteristics were improved in the ultrasonic sensors including the inner frames having the through-holes. In particular, improved reverberation characteristics are obtained by providing the through-holes in the side portion of the inner frame along the long-axis direction of the portion, not being in contact with the inner frame, in the bottom portion of the cap member and along the direction orthogonal to the long-axis direction.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. An ultrasonic transducer comprising:
   a substantially cylindrical cap member having a bottom;
   a piezoelectric element providing on an inner bottom surface of the cap member;
   an inner frame made of a material having an acoustic impedance greater than a material from which the cap member is made, and arranged inside the cap member so as to be in contact with a side portion, including an end portion, of the cap member; and
   a damper arranged in the inner frame so as to be in direct contact with at least a portion of the side portion of the cap member.

2. The ultrasonic transducer according to claim 1, wherein the damper is in direct contact with the portion of the side portion of the cap member via through-holes provided in the inner frame.

3. The ultrasonic transducer according to claim 1, wherein gaps are partially provided between the cap member and the inner frame at the end portion of the cap member, and additional dampers that are made of the same material as that of the damper arranged in the inner frame are disposed in the gaps.

4. The ultrasonic transducer according to claim 2, wherein the bottom portion of the cap member has a portion that is not in contact with an end of the inner frame and includes a central portion of the cap member and a long axis extending along a certain direction, and the through-holes or the gaps are provided in a side portion of the inner frame along the long-axis direction of the portion that is not in contact with the end of the inner frame, in the bottom portion of the cap member and along a direction that is substantially perpendicular to the long-axis direction.

5. The ultrasonic transducer according to claim 1, wherein a curved portion extends from the bottom portion to the side portion of the cap member, and an exterior component is arranged on the outer side surface of the cap member so as to cover the curved portion.

6. The ultrasonic transducer according to claim 1, wherein the damper is arranged so as to extend from inside to outside the inner frame, and is in direct contact with the outer side surface of the cap member.

7. The ultrasonic transducer according to claim 6, wherein a curved portion extends from the bottom portion to the side portion of the cap member, and the damper disposed on the outer side surface of the cap member covers the curved portion.

8. The ultrasonic transducer according to claim 1, wherein shoulders having a size corresponding to a thickness of the cap member are provided on the outer side surface of the inner frame at the end portion of the cap member, and an external diameter of the inner frame outside the cap member is greater than an external diameter of the inner frame inside the cap member such that substantially no level difference exists between the cap member and the inner frame.

9. An ultrasonic transducer comprising:
a substantially cylindrical cap member having a bottom;
a piezoelectric element located on an inner bottom surface of the cap member;
an inner frame made of a material having an acoustic impedance greater than a material from which the cap member is made, and arranged inside the cap member so as to be in contact with a side portion, including an end portion, of the cap member; and
dampers disposed in gaps partially provided between the cap member and the inner frame at the end portion of the cap member so as to be in contact with the inner side surface of the cap member.

10. The ultrasonic transducer according to claim 9, wherein the bottom portion of the cap member has a portion that is not in contact with an end of the inner frame and includes a central portion of the cap member and a long axis extending along a certain direction, and the through-holes or the gaps are provided in a side portion of the inner frame along the long-axis direction of the portion that is not in contact with the end of the inner frame, in the bottom portion of the cap member and along a direction that is substantially perpendicular to the long-axis direction.

11. The ultrasonic transducer according to claim 9, wherein a curved portion extends from the bottom portion to the side portion of the cap member, and an exterior component is arranged on the outer side surface of the cap member so as to cover the curved portion.

12. The ultrasonic transducer according to claim 9, wherein shoulders having a size corresponding to a thickness of the cap member are provided on the outer side surface of the inner frame at the end portion of the cap member, and an external diameter of the inner frame outside the cap member is greater than an external diameter of the inner frame inside the cap member such that substantially no level difference exists between the cap member and the inner frame.

* * * * *